Jan. 9, 1968  C. R. SKARIN  3,362,519
APPARATUS FOR TRANSFERRING PRODUCTS BETWEEN A CONVEYING
SURFACE AND A VARIABLE SPEED CONVEYOR SUCH
AS A BAKERY OVEN CONVEYOR
Filed Aug. 22, 1966  2 Sheets-Sheet 1
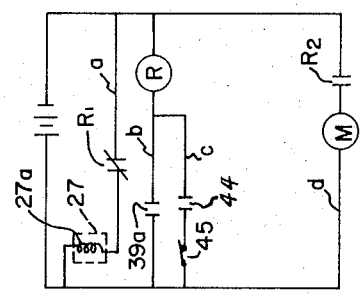
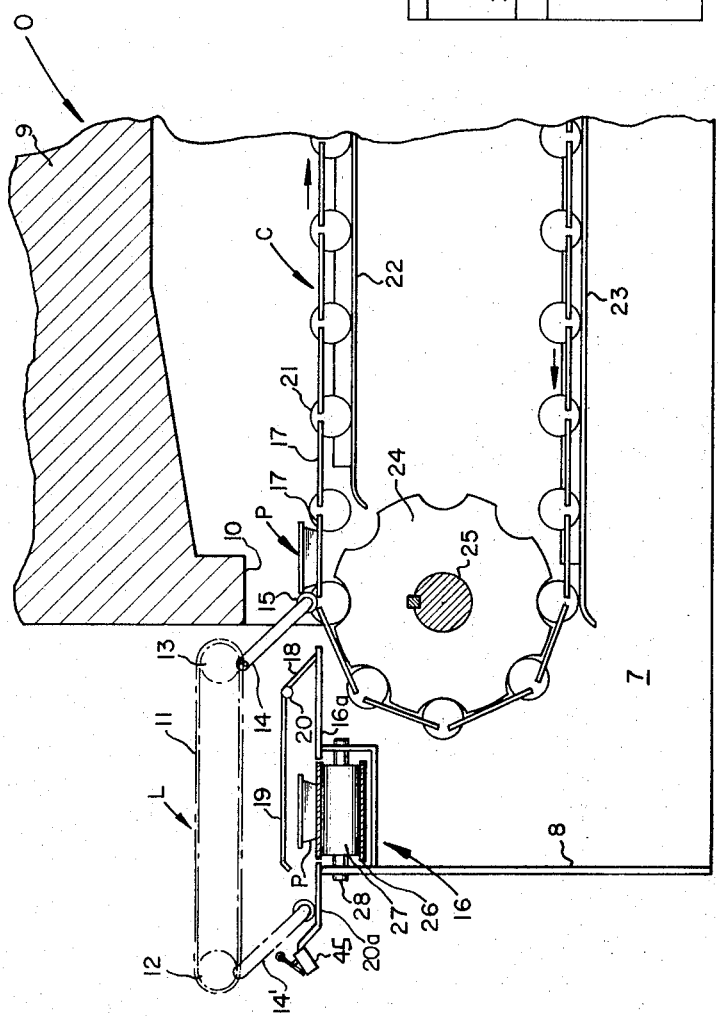
INVENTOR.
CARL RICHARD SKARIN
BY
Learman, Learman & McCulloch
ATTORNEYS Jan. 9, 1968 C. R. SKARIN 3,362,519
APPARATUS FOR TRANSFERRING PRODUCTS BETWEEN A CONVEYING
SURFACE AND A VARIABLE SPEED CONVEYOR SUCH
AS A BAKERY OVEN CONVEYOR
Filed Aug. 22, 1966 2 Sheets-Sheet 2

INVENTOR.
CARL RICHARD SKARIN
BY
Learman, Learman & McCulloch
ATTORNEYS

United States Patent Office 3,362,519
Patented Jan. 9, 1968

3,362,519
APPARATUS FOR TRANSFERRING PRODUCTS BETWEEN A CONVEYING SURFACE AND A VARIABLE SPEED CONVEYOR SUCH AS A BAKERY OVEN CONVEYOR
Carl Richard Skarin, Saginaw, Mich., assignor to Baker Perkins Inc., Saginaw, Mich., a corporation of New York
Filed Aug. 22, 1966, Ser. No. 574,129
10 Claims. (Cl. 198—24)

This invention relates to transfer systems, specifically systems of the type wherein transfer devices are employed to move bakery products successively between a variable speed receiving conveyor and an associated conveyor, and more particularly to certain new and useful improvements in oven systems wherein an intermittently operating loader is employed to move the pans and means is provided for starting the intermittently traveling loader at various times depending upon the speed of travel of the oven conveyor which determines the length of time the products in the pans are to remain in the oven. For instance, if the loader is set to deliver pans to an oven conveyor traveling at one speed and the speed of the oven conveyor is adjusted, it will be necessary for the system to compensate for this. It is necessary that any change in oven speed be accompanied by a corresponding change in frequency of the working strokes of the loader so that the loader will still perform one stroke for each unit length of conveyor travel. United States Patent No. 1,795,352 illustrates one approach which has been used by the assignee of the present application. Other bakery equipment manufacturers have employed electric timers. However, such timers measure time and not distance and when the speed of the oven conveyor is adjusted it is also necessary to adjust the timers used.

One of the prime objects of the present invention is to design a highly reliable and yet inexpensive system wherein a linear measuring scale can be employed and the slippage problem which frequently occurs in variable speed systems is obviated.

Briefly, the present invention is concerned with a system incorporating loader starting means employing relatively movable actuator and linear scale members, and switch means connected to energize the loader, one of the two members being releasably coupled to and driven relative to the other member by the receiving conveyor to dispose the members in a predetermined relative position wherein the switch is operated to start the loader.

Other objects and advantages of the invention will be pointed out specifically or will become apparent from the following description when it is considered in conjunction with the appended claims and the accompanying drawings, in which:

FIGURE 1 is a sectional, side elevational view somewhat schematically showing a typical loader pusher device moving pans onto a hearth type oven conveyor;

FIGURE 4 is a typical electrical control circuit for the system.

Figure 3:
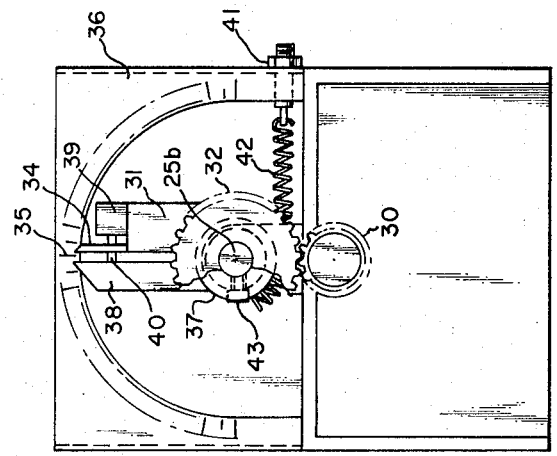
FIGURE 3 is a side elevational view thereof with the movable actuator bar shown in switch tripping position.
Figure 2:
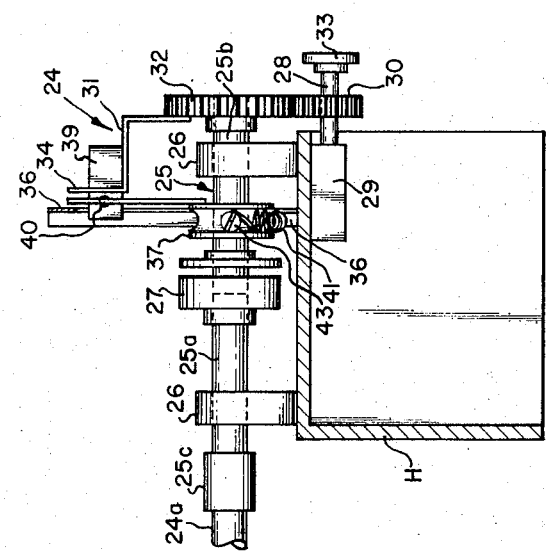
FIGURE 2 is a fragmentary, transverse sectional view illustrating the loader actuating mechanism which is driven by the oven conveyor.

Referring now more particularly to the accompanying drawings, and in the first place to FIGURE 1, an oven generally designated O and having side walls 7, a front wall 8, and a top wall 9 is shown as including an endless hearth conveyor generally designated C which extends from an oven inlet opening 10 to a discharge opening (not shown) at the opposite end of the oven O. The oven O may be a conventional tunnel oven which is loaded with groups of pans or pansets P by a diagrammatically illustrated pusher type loading mechanism generally designated L in the usual manner. For example, the loader mechanism may be of the character illustrated in the aforementioned patent wherein on either side of the oven O an endless chain 11 trained around sprockets 12 and 13 carries a link 14 on which a pusher bar or shaft 15 is secured. When the links 14 on the chains 11 on each side of the oven move forwardly from the position shown in diagrammatic lines at 14' to the position shown in solid lines, the pusher shaft 15 moves a group of pans from the transversely disposed conveyor generally designated 16 to a hearth plate 17 in the manner indicated in FIGURE 1. As the arms 14 move upwardly around sprockets 13 and thence rearwardly with the chains 11, the pusher bar 15 in its return stroke moves upwardly along a pivotal track section 18 at each side of the oven which is pivoted to an elevated, longitudinally extending guide 19 at each side as at 20 and thence proceeds rearwardly along the tracks 19 in raised position until it has cleared the incoming pans P on conveyor 16. At the front of the oven O a pusher bar support plate 20a is provided as usual.

As shown, the hearth plates 17 may be carried on rollers 21 traveling on upper and lower guide tracks 22 and 23, supported by the oven framework at each side of the oven. Sprockets 24 mounted on the oven drive shaft 24a are provided at the front end of the oven and are similarly provided at the rear end of the oven.

As shown in FIGURE 1, the conveyor 16 may comprise an endless belt or grid 26 trained around rollers 27 which are supported by shafts 28, and one of the shafts 28 may be driven by a suitable drive motor to move groups of pans P into position in front of the oven opening 10 as necessary so that pans P may be fed across support surface 16a to successive hearth plates 17.

Mounted at one side of the oven, on a separate frame or housing H, is a loader control assembly which, as previously observed, may be set to start the motor M (FIGURE 4) which drives loader L at the proper time to deliver a group of pans P to the oven conveyor O. The mechanism involved includes a shaft assembly generally designated 25 which is journaled in bearings 26 on the housing H. The shaft assembly 25 includes a shaft portion 25a which is coupled to the oven shaft 24a as at 25c and which may be selectively coupled to a shaft portion 25b by a suitable electric clutch 27 having a solenoid coil 27a. The shaft assembly 25 will rotate as a unit when the clutch 27 is engaged following the completion of the return stroke of pusher bar 15 and for a predetermined time interval during which the loader is inactive and following which it is started.

The length of the predetermined interval is controlled by a dial shaft 28 journaled by a bearing member 29 which is connected via a pinion gear 30 with a settable pointer member 31 fixed on a pinion gear 32 with which the gear 30 is in mesh, gear 32 being mounted for free rotation on the shaft section 25b. A knob 33 is provided on the outer end of the shaft 28 to facilitate adjustment of the settable member 31 which has a pointer portion 34 which is set relative to an arcuate scale 35 provided on an inversely disposed, generally channel-shaped frame member 36.

Also mounted on the shaft section 25b but fixed thereto for rotation therewith is a sheave or pulley member 37 on which is mounted an actuator member 38. While it could be mounted on the actuator member 38, in the present instance a limit switch 39 is shown as mounted on the settable member 31 and may be of the type having a depressible plunger 40 which, when depressed, makes a set of contacts 39a (see FIGURE 4). Connected with the frame member 36 as by a bolt and nut assembly 41 to return the actuator 38, when permitted to do so upon deenergization of clutch 27, is a return spring 42 which may be secured to the pulley 37 by a screw member 43.

In FIGURE 4 I have illustrated a typical electrical control circuit showing the solenoid coil 27a of clutch 27 connected in a circuit line $a$ with the normally closed contacts $R_1$ of a holding relay R which is connected in a circuit line $b$ with the normally open contacts 39a of switch 39. Relay contacts 44 and a limit switch 45 which is actuated by one of the arms 14 are provided in a circuit line $c$ in parallel with line $b$ to deenergize holding relay R. Also, relay R has a set of contacts $R_2$ which are normally open and are connected in circuit line $d$ with loader motor M.

In operation the loader motor M is started by the actuator arm 38 actuating switch 39 and energizing holding relay R to close contacts $R_2$. When the loader arms 14 have completed a cycle, one of them trips limit switch 45 to deenergize holding relay R. This permits relay contacts $R_1$ to close and energize clutch 27 so that shaft portion 25b travels with shaft portion 25a and oven shaft 24a. After a predetermined time interval, actuator arm 38 makes switch 39 and energizes relay R to close the contacts $R_2$ and again start the loader motor M. Energization of relay R at the same time opens relay contacts $R_1$ to deenergize clutch coil 27a and disengage shaft portions 25a and 25b so that the spring 42 can return arm 38 to original starting position.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

I claim:

1. An oven system including an oven conveyor and a drive take-off therefrom; product conveyor means associated with said oven conveyor; transfer means for moving farinaceous products between said product conveyor means and oven conveyor and having an intermittently operated drive means; a linear scale member; a member cooperative therewith; one of said members being releasably coupled to said oven drive take-off and movable through a variable path of travel relative to the other member; switch means operated after a predetermined relative travel of said members for operating said intermittently operated drive means for the transfer means and causing said transfer means to move products between the product conveyor means and oven conveyor; and means operated after said switch means is operated to release said one member from said oven drive take-off means.

2. The combination defined in claim 1 in which said linear scale member is fixed in position and a settable indicator member is positionable relative thereto in various positions; said switch means is carried on said settable indicator member; and said cooperative member is releasably coupled to said oven drive take-off for movement from an initial starting position over to engage and operate the switch means on the settable indicator member.

3. The combination defined in claim 1 in which clutch means normally connects said oven drive take-off and cooperative member.

4. The combination defined in claim 3 in which said oven drive take-off comprises a first shaft portion and said cooperative member comprises an actuator arm mounted on a second shaft portion which is releasably coupled to said first shaft portion by said clutch means.

5. The combination defined in claim 4 in which spring means returns said actuator arm when said clutch means is disabled.

6. The combination defined in claim 3 in which said clutch means comprises electric clutch means deenergized when said switch means is operated.

7. The combination defined in claim 6 in which a second switch means is operated by said transfer means at the end of its cycle to reenergize said clutch means.

8. The combination defined in claim 1 in which said transfer means comprises a reciprocable loader pusher bar.

9. The combination defined in claim 1 in which said oven conveyor is a hearth plate conveyor.

10. In a system including a receiving conveyor and a drive takeoff therefrom: product conveyor means associated with said receiving conveyor; transfer means for moving products between said product conveyor means and receiving conveyor and having an intermittently operated drive means; a linear scale member; a member cooperative therewith; one of said members being releasably coupled to said drive takeoff and movable through a variable path of travel relative to the other member; switch means operated after a predetermined relative travel of said members for operating said intermittently operated drive means for the transfer means and causing said transfer means to move products between the product conveyor means and receiving conveyor; and means operated after said switch means is operated to release said one member from said drive takeoff.

References Cited

UNITED STATES PATENTS 1,795,352   3/1931   Sundbom _____ 107—57

EDWARD A. SROKA, *Primary Examiner.*